United States Patent
Cho et al.

(10) Patent No.: US 10,209,913 B2
(45) Date of Patent: Feb. 19, 2019

(54) SYSTEM, METHOD AND COMPUTER PROGRAM PRODUCT FOR ACCELERATING ITERATIVE GRAPH ALGORITHMS BY MEMORY LAYOUT OPTIMIZATION

(71) Applicant: International Business Machines Corporation, Armonk, NY (US)

(72) Inventors: Minsik Cho, Austin, TX (US); Daniel Brand, Yorktown Heights, NY (US); Ulrich Alfons Finkler, Yorktown Heights, NY (US); David Shing-ki Kung, Yorktown Heights, NY (US); Ruchir Puri, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 15/420,629

(22) Filed: Jan. 31, 2017

(65) Prior Publication Data
US 2018/0217775 A1   Aug. 2, 2018

(51) Int. Cl.
*G06F 3/06* (2006.01)
*G06F 12/0802* (2016.01)

(52) U.S. Cl.
CPC .......... *G06F 3/0635* (2013.01); *G06F 3/061* (2013.01); *G06F 3/0673* (2013.01); *G06F 12/0802* (2013.01); *G06F 2212/60* (2013.01)

(58) Field of Classification Search
CPC ...... G06F 3/061; G06F 3/0613; G06F 3/0632; G06F 3/0635; G06F 3/0644; G06F 3/067; G06F 3/0673; G06F 3/0683
USPC .................................................. 711/118, 170
See application file for complete search history.

(56) References Cited

U.S. PATENT DOCUMENTS

| | | | |
|---|---|---|---|
| 8,510,709 B2 | 8/2013 | Bordelon et al. | |
| 8,654,126 B2 | 2/2014 | Gansner et al. | |
| 2005/0289312 A1* | 12/2005 | Ghosal | G06F 3/0611 711/167 |
| 2014/0344508 A1* | 11/2014 | Khan | G06F 9/5016 711/103 |
| 2015/0007182 A1 | 1/2015 | Rossbach et al. | |
| 2017/0242590 A1* | 8/2017 | Gokhale | G06F 3/0605 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Gary J Portka
(74) *Attorney, Agent, or Firm* — Jennifer R. Davis, Esq.; McGinn IP Law Group, PLLC

(57) ABSTRACT

An iterative graph algorithm accelerating method, system, and computer program product, include recording an order of access nodes in a memory layout, reordering the access nodes in the memory layout in accordance with the recorded order, and updating edge information of the reordered access nodes.

20 Claims, 7 Drawing Sheets

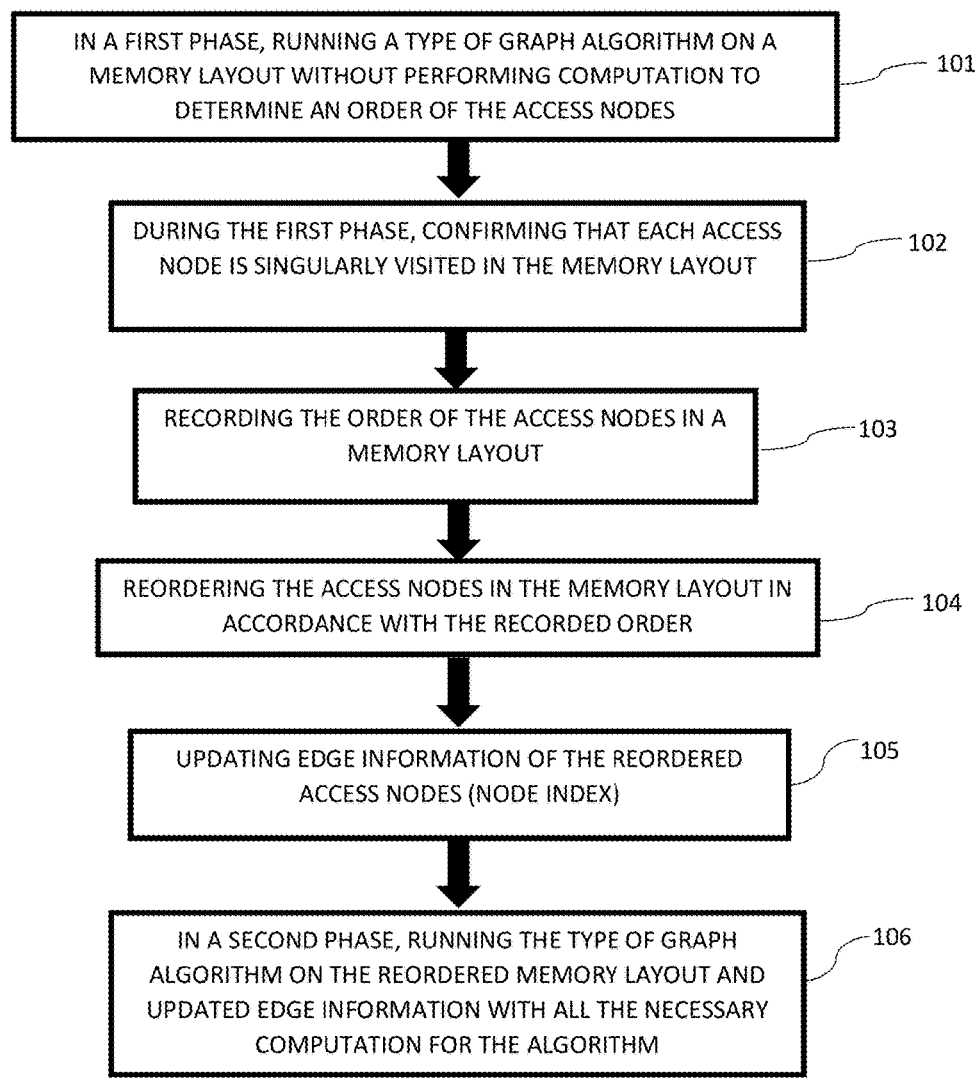

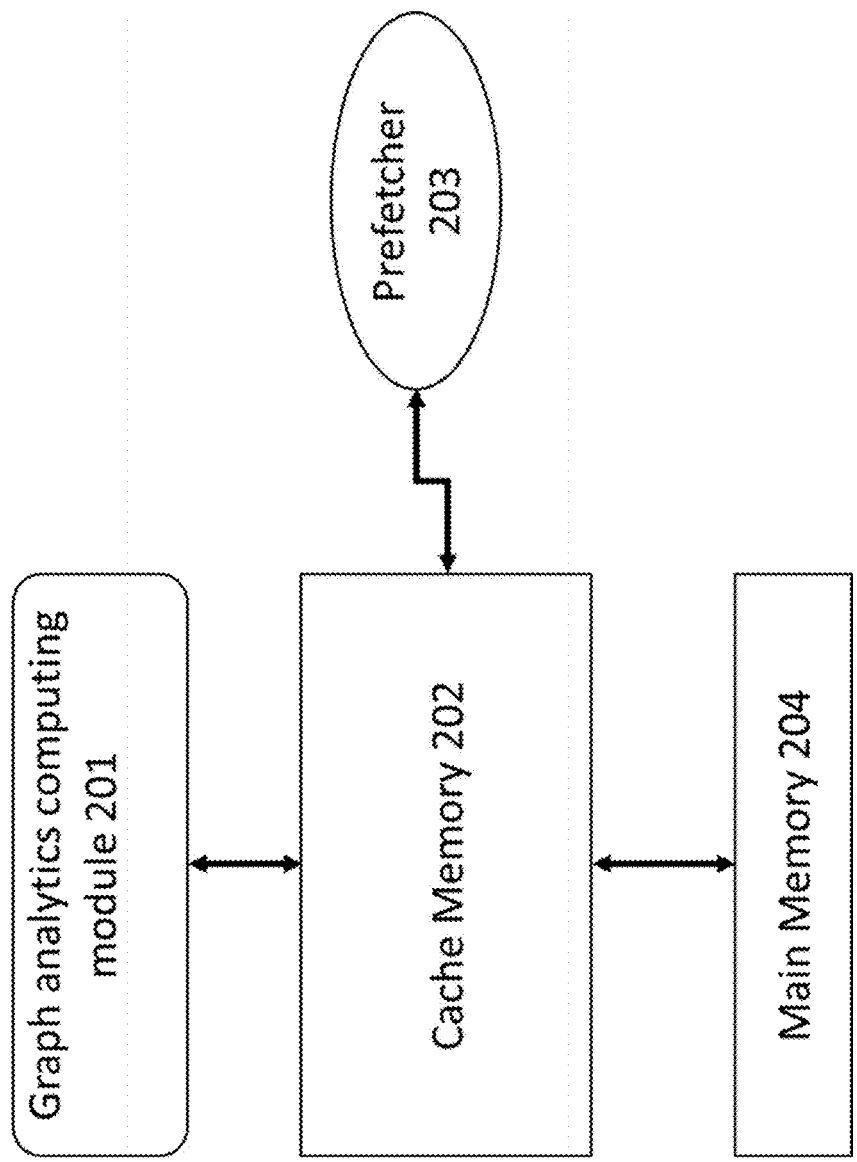

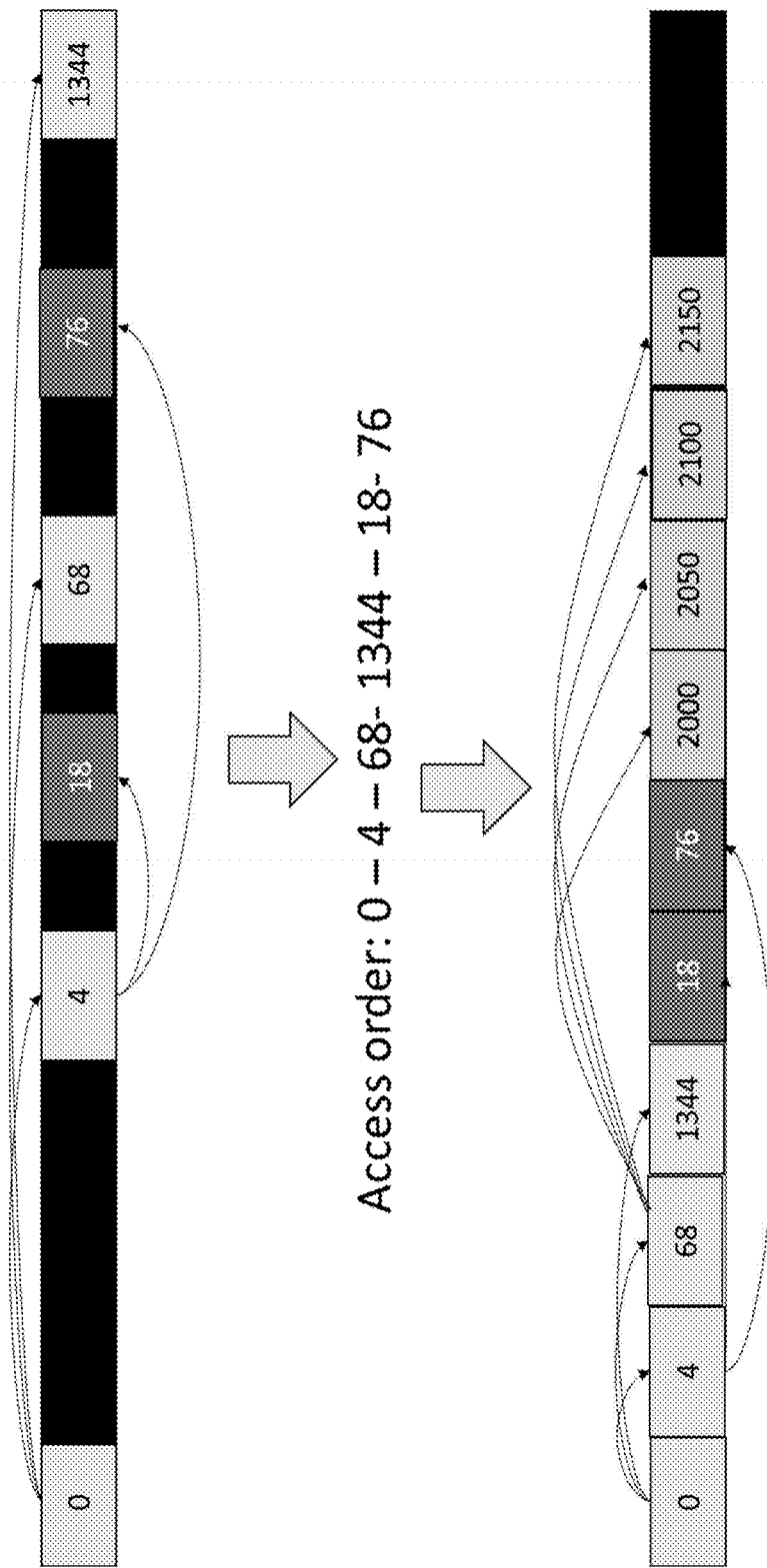

US 10,209,913 B2

SYSTEM, METHOD AND COMPUTER PROGRAM PRODUCT FOR ACCELERATING ITERATIVE GRAPH ALGORITHMS BY MEMORY LAYOUT OPTIMIZATION

BACKGROUND

The present invention relates generally to an iterative graph algorithm accelerating method, and more particularly, but not by way of limitation, to a system, method, and computer program product for tuning a memory layout of a graph data structure such that an iterative graph algorithm can benefit from better cache locality.

Graph data structures are conventionally linear arrays and graph sizes are becoming bigger and more complex. Also, the structures are not algorithm-specific, which leaves much room for improvement in the graph data structures. Conventional graph analytics techniques suffer from irregular memory access patterns because neighboring nodes are not necessarily together, increasing cache sizes, Translation Look-Aside Buffer (TLB) misses and hamper a pre-fetcher, etc.

Thus, there is a need in the art for a technique that may re-order memory layouts such that memory access patterns are more regular, reduce cache misses, and facilitate a pre-fetcher.

SUMMARY

In an exemplary embodiment, the present invention can provide a computer-implemented iterative graph algorithm accelerating method, the method including in a first phase, running a type of graph algorithm on a memory layout without performing computation to determine an order of the access nodes in the memory layout, recording the order of the access nodes in a memory layout, reordering the access nodes in the memory layout in accordance with the recorded order, and updating edge information of the reordered access nodes.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 1 exemplarily shows a high-level flow chart for an iterative graph algorithm accelerating method 100;

FIG. 2 exemplarily shows a hardware platform that can execute the iterative graph algorithm accelerating method 100;

FIG. 4 exemplarily depicts a linear array of a graph data structure in a memory layout before and after an execution of the method 100;

DETAILED DESCRIPTION

Figure 3A:
FIGS. 3A-3B exemplarily depict a node list and an edge list of a linear array of a graph data structure in a memory layout.

The invention will now be described with reference to FIGS. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the iterative graph algorithm accelerating method 100 includes various steps to reorder a memory layout so that a memory access pattern is more regular to reduce cache misses, facilitate a pre-fetcher, and improve efficiency of access to the memory access pattern. As shown in at least FIG. 5, one or more computers of a computer system 12 according to an embodiment of the present invention can include a memory 28 having instructions stored in a storage system to perform the steps of FIG. 1.

Although one or more embodiments (see e.g., FIGS. 5-7) may be implemented in a cloud environment 50 (see e.g., FIG. 6), it is nonetheless understood that the present invention can be implemented outside of the cloud environment.

Figure 3B:
Figure 5:
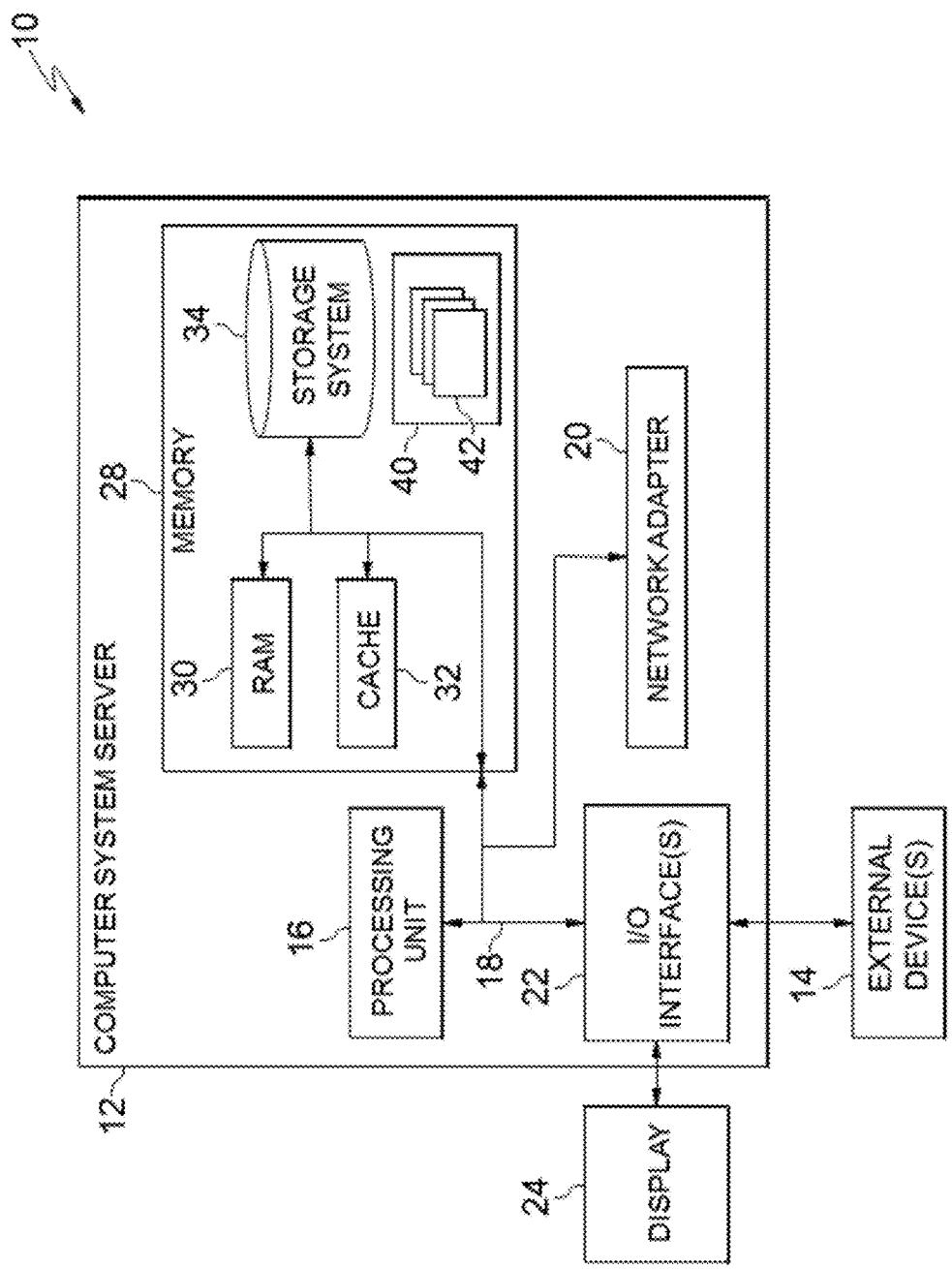
FIG. 5 depicts a cloud computing node 10 according to an embodiment of the present invention.
Figure 6:
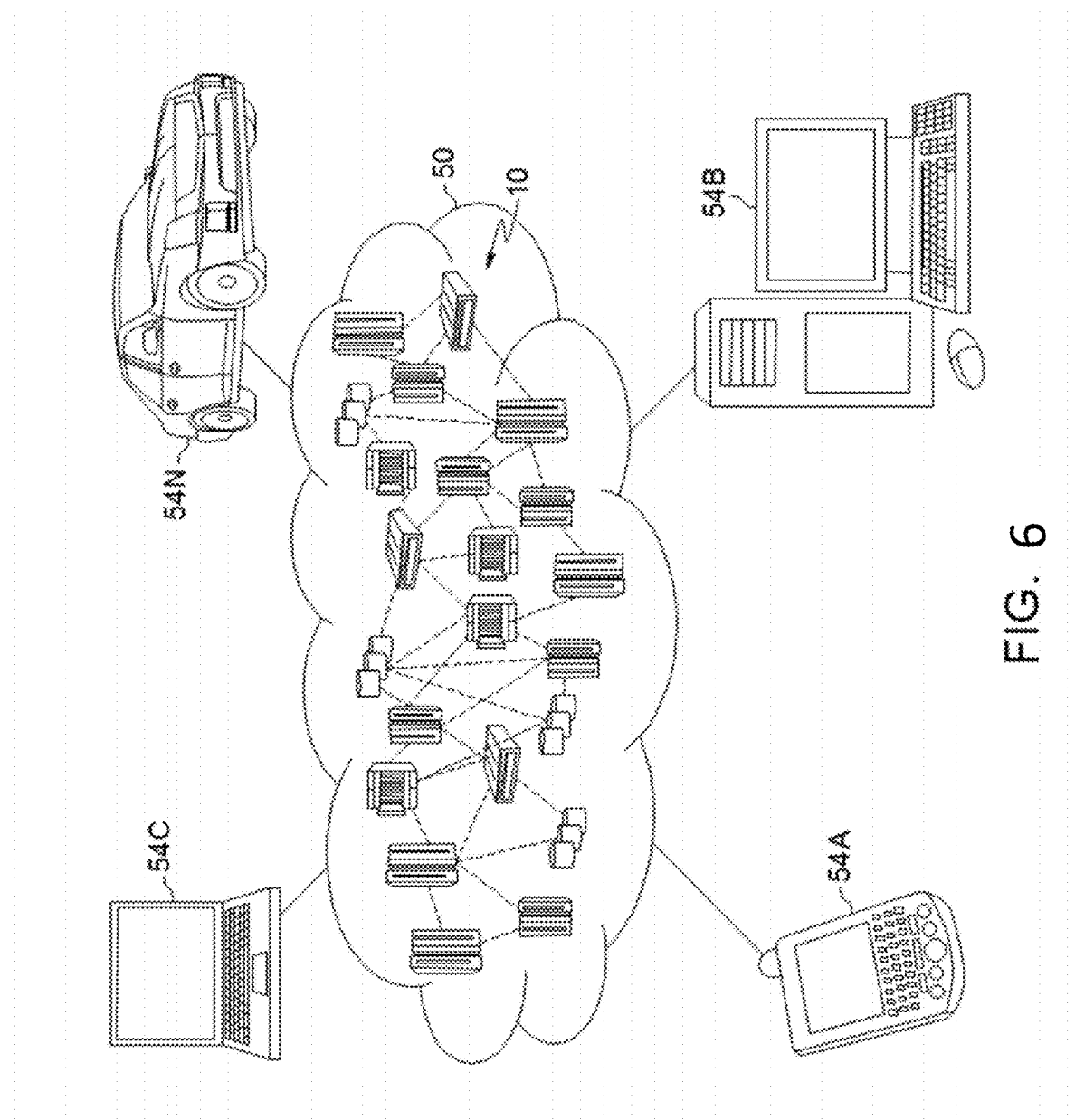
FIG. 6 depicts a cloud computing environment 50 according to an embodiment of the present invention.

Referring now to FIGS. 3A-B, FIGS. 3A-3B depict a graph data structure as represented in the software of the memory layout. FIG. 3A depicts a node list in the memory layout. For example, node 0 (0, 3) is the node 0 connected to 3 other nodes. Similarly, node 4 (7, 2) is node 4 with instructions to jump to the 7$^{th}$ item in the node list and then count to 2 elements downstream as the neighbors. FIG. 3B depicts an edge list. For example, nodes 4, 68, and 1344 are neighbor nodes connected to node 0 and nodes 18 and 6 are neighbor nodes connected to node 4. However, the nodes of FIGS. 3A-3B are not grouped together such that there is an irregular memory access pattern, which increases cache misses and TLB, while potentially hampering the pre-fetcher. Indeed, in the conventional techniques it is unknown what type of data structure one will have and thus no guarantee that, when a neighbor node is visited, a cache TLB hit will occur.

Referring now to FIGS. 1 and 4, in step 101, in a first phase, a type of graph algorithm is run on a memory layout without performing computation to determine an order of the access nodes. That is, a user has a graph algorithm and it has two parts (1) an algorithm on how to travel the graph itself (i.e., what order the nodes are in), and (2) an algorithm on what to do the meta-data in the node that is being visiting (i.e., some computation with the meta-data). In order to reorder graph (as described later), only the first algorithm on how to travel the memory layout is required and not the second with computation. Thus, in the first phase, the algorithm travels through the graph as if user's algorithm does, and skip the computation as this is not required (only the order of the access nodes is required). And, the original graph algorithm may require to visit the same node many times, but it is confirmed that this is not allowed when recording visit order as we cannot reorder the same node twice or more (i.e., step 102). That is, in step 102, during the first phase, it is confirmed that each access node is singularly visited in the memory layout and double visits are confirmed not to occur with the reordered access nodes.

Therefore, in step 101, a type of graph algorithm without computation is run to get the order of the access nodes in the memory layout. That is, a so called "trial run" is run for the algorithm to only get the order of the access nodes in the memory layout.

In step 103, an order of access nodes is recorded in a memory layout. For example, the access order in FIG. 4 of accessing nodes is 0, then 4, 68, 1344, 18, and 76 is recorded (i.e., the nodes are ordered in a random access order). That is, the type of graph (algorithm) will access the access nodes in the order recorded in step 101.

In step 104 (and the lower portion of FIG. 4), the access nodes are reordered in the memory layout in accordance with the recorded order. For example, node 0 is the first access node, which is connected to node 4 having neighboring nodes 68 and 1344. In step 102, node 4 and its connected nodes of the 2 neighbors are relocated to be in the adjacent blocks of the cache memory in series after the access node 0. Each of nodes 0, 4, 68, and 1344 is connected/neighbor nodes and is grouped together for sequential access in the memory layout. Similarly, because node 18 is connected to node 4 and node 76 is neighboring node 18, nodes 18 and 76 are relocated together after the first group of access nodes. That is, nodes 18 and 76 are sequentially accessed when node 4 is accessed.

The reordering repeats itself by grouping each connected/neighboring node group together after the last group of access nodes. For example, if node 68 is connected with a node 2000, which has neighboring nodes 2050, 2100, 2150, then nodes 2050, 2100, and 2150 are reordered after nodes 18 and 76. Thus, the nodes are sequentially ordered by moving neighbor/connected access nodes together and grouping the access nodes.

In step 105, the edge information (i.e., a node index) of the reordered access nodes is updated. For example, node 4 in the reordered order of access nodes in FIG. 4 is updated for edge information of (4, 2) indicating that node 4 is connected to the $4^{th}$ item in the memory layout (i.e., node 76) and then count 2 elements downstream as neighbors (i.e., nodes 18 and 76).

In step 106, in a second phase the type of graph algorithm is performed on the reordered memory layout and updated edge information with all of the necessary computation for the algorithm. Thus, with optimized layout, the actual/whole graph algorithm can be run and benefit from faster memory access. That is, the actual/whole graph algorithm which is used in the first phase to capture the order, is re-run on the optimized memory layout for the targeted application.

With the invention, there is much time-savings. For example, in conventional techniques, based on a Breadth-first search (BFS), and each access node needs 10 seconds using the random access memory layout (e.g., the original memory layout) and needs 100 BFS iterations to converge, a total runtime for the BFS is 1000 seconds. However, the inventive reordered access nodes (i.e., the sequential access memory layout) requires only a one time optimization of the memory layout by the method 100 that can take, for example, 15 seconds. Because the memory layout is sequentially ordered, each BFS iteration can take only 6 seconds. Thus, with the 100 iterations to coverage, a total runtime is 615 seconds, which is approximately a 40% increase in speed over conventionally random access layouts.

Referring now to FIG. 2, FIG. 2 exemplarily depicts a hardware platform including a graph analytics computing module 201 that can execute the method 100 on the cache memory 202, the pre-fetcher 203 that populates the cache memory 202, and the main memory 204 of a computer.

Thus, the invention re-orders the memory layout so that memory access patterns become more regular, thereby to reduce cache/TLB misses and facilitate prefetcher coupled to a cache memory. In short, neighbors and connected nodes are moved together to obtain time savings.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 6, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 7:
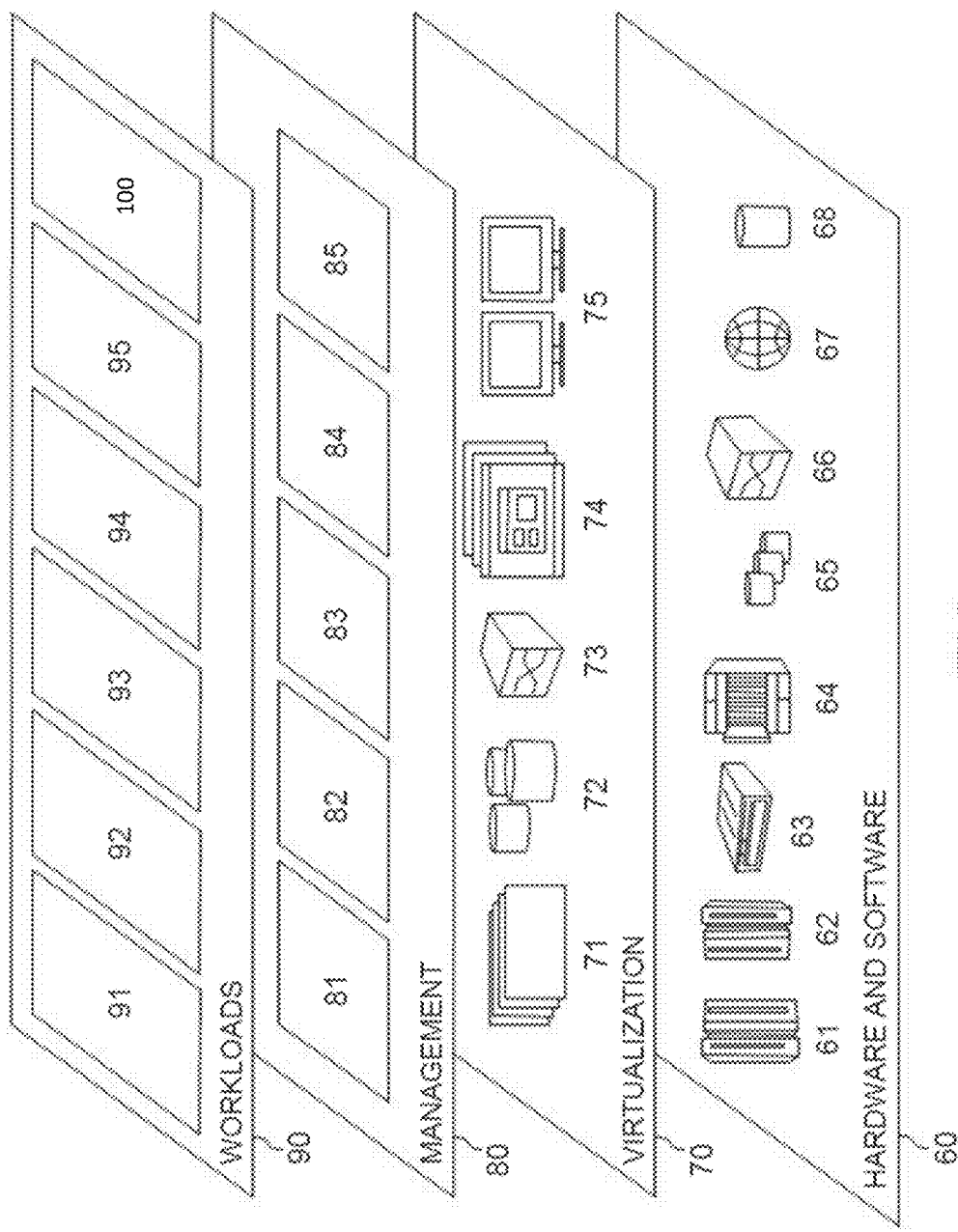
FIG. 7 depicts abstraction model layers according to an embodiment of the present invention.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud computing environment 50 can communicate with any type of computerized circuit over any type of network and/or network addressable connection (e.g., using a web browser).

Referring now to FIG. 8, an exemplary set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the iterative graph algorithm accelerating method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented iterative graph algorithm accelerating method, the method comprising:
   in a first phase, running a type of graph algorithm on how to travel the graph itself on a memory layout, without performing computation, to determine an order of the access nodes in the memory layout;
   recording the order of the access nodes in a memory layout;
   reordering the access nodes in the memory layout in accordance with the recorded order; and
   updating edge information of the reordered access nodes.

2. The computer-implemented method of claim 1, further comprising, in a second phase, running the type of graph algorithm on the reordered memory layout and updated edge information with all necessary computation for the algorithm.

3. The computer-implemented method of claim 1, further comprising, during the first phase, confirming that each of the reordered access nodes is singularly visited in the memory layout.

4. The computer-implemented method of claim 1, wherein the edge information comprises a node index.

5. The computer-implemented method of claim 1, wherein the reordering relocates neighboring access nodes and connected access nodes together in the memory layout.

6. The computer-implemented method of claim 1, wherein the reordering relocates an access node of the access nodes and each neighboring access node together in series in the memory layout, and
wherein the reordering relocates each connected access node to each of the neighboring access nodes relocated together to a location together after a last access node in the series in the memory layout.

7. The computer-implemented method of claim 1, wherein the reordering changes a location of the access nodes in a cache memory of the memory layout.

8. The computer-implemented method of claim 1, embodied in a cloud-computing environment.

9. A computer program product for iterative graph algorithm accelerating, the computer program product comprising a computer-readable storage medium having program instructions embodied therewith, the program instructions executable by a computer to cause the computer to perform:
in a first phase, running a type of graph algorithm on how to travel the graph itself on a memory layout, without performing computation, to determine an order of the access nodes in the memory layout;
recording the order of the access nodes in a memory layout;
reordering the access nodes in the memory layout in accordance with the recorded order; and
updating edge information of the reordered access nodes.

10. The computer-program product of claim 9, further comprising, in a second phase, running the type of graph algorithm on the reordered memory layout and updated information with all necessary computation for the algorithm.

11. The computer-program product of claim 9, further comprising, during the first phase, confirming that each of the reordered access nodes is singularly visited in the memory layout.

12. The computer-program product of claim 9, wherein the edge information comprises a node index.

13. The computer-program product of claim 9, wherein the reordering relocates neighboring access nodes and connected access nodes together in the memory layout.

14. The computer-program product of claim 9, wherein the reordering relocates an access node of the access nodes and each neighboring access node together in series in the memory layout, and
wherein the reordering relocates each connected access node to each of the neighboring access nodes relocated together to a location together after a last access node in the series in the memory layout.

15. The computer-program product of claim 9, wherein the reordering changes a location of the access nodes in a cache memory of the memory layout.

16. An iterative graph algorithm accelerating system, said system comprising:
a processor; and
a memory operably coupled to the processor, the memory storing instructions to cause the processor to perform:
in a first phase, running a type of graph algorithm on how to travel the graph itself on a memory layout, without performing computation, to determine an order of the access nodes in the memory layout;
recording the order of the access nodes in a memory layout;
reordering the access nodes in the memory layout in accordance with the recorded order; and
updating edge information of the reordered access nodes.

17. The system of claim 16, further comprising, in a second phase, running the type of graph algorithm on the reordered memory layout and updated edge information with all necessary computation for the algorithm.

18. The system of claim 16, further comprising, during the first phase, confirming that each of the reordered access nodes is singularly visited in the memory layout.

19. The system of claim 16, wherein the edge information comprises a node index.

20. The system of claim 16, embodied in a cloud-computing environment.

* * * * *